(12) United States Patent
Tang et al.

(10) Patent No.: US 11,333,624 B2
(45) Date of Patent: May 17, 2022

(54) THREE-ELECTRODE ARRAY LOCAL ELECTROCHEMICAL INFORMATION TESTING SYSTEM AND TESTING METHOD

(71) Applicant: CHINA UNIVERSITY OF PETROLEUM (EAST CHINA), Qingdao (CN)

(72) Inventors: Xiao Tang, Qingdao (CN); Yan Li, Qingdao (CN); Chaoran Ma, Qingdao (CN); Miaomiao Xu, Qingdao (CN); Xiaolei Lv, Qingdao (CN)

( * ) Notice: Subject to any disclaimer, the term of this patent is extended or adjusted under 35 U.S.C. 154(b) by 207 days.

(21) Appl. No.: 16/677,705

(22) Filed: Nov. 8, 2019

(65) Prior Publication Data
US 2020/0072781 A1    Mar. 5, 2020

Related U.S. Application Data

(63) Continuation of application No. PCT/CN2017/101319, filed on Sep. 11, 2017.

(30) Foreign Application Priority Data

May 9, 2017   (CN) .......................... 201710319384.7

(51) Int. Cl.
*G01N 27/416*   (2006.01)
*G01N 17/02*    (2006.01)
(Continued)

(52) U.S. Cl.
CPC ........... *G01N 27/301* (2013.01); *G01N 17/02* (2013.01); *G01N 27/416* (2013.01); *G01N 27/48* (2013.01)

(58) Field of Classification Search
CPC ............. G01N 33/4836; G01N 27/416; G01N 27/4161; G01N 27/286; G01N 27/30; G01N 27/327–3272; G01N 17/02
See application file for complete search history.

(56) References Cited

U.S. PATENT DOCUMENTS 4,225,410 A * 9/1980 Pace .................... G01N 33/492
                                                          204/406
4,871,440 A * 10/1989 Nagata .................. C12Q 1/001
                                                          204/403.1
(Continued)

FOREIGN PATENT DOCUMENTS

CN       1758056 A      4/2006
CN     102980933 A      3/2013
(Continued)

OTHER PUBLICATIONS

EPO computer-generated English translation of the Description section CN 102980933 A, downloaded Jul. 29, 2012, patented Mar. 20, 2013 (Year: 2013).*

(Continued)

*Primary Examiner* — Alexander S Noguerola

(57) ABSTRACT

A three-electrode array local electrochemical information testing system and a testing method, the testing system comprising: a concentric ring three-electrode array, a high-speed switch and an electrochemical workstation, which are electrically connected in sequence; the concentric ring three-electrode array comprises a plurality of concentric ring three-electrode units, adjacent concentric ring three-electrode units being separated by an insulating material; a concentric ring three-electrode unit comprises a ring-shaped auxiliary electrode, a solid-state reference electrode and a wire-shaped working electrode; the ring-shaped auxiliary electrode and the solid-state reference electrode are both formed in an ring-shaped shape; the wire-shaped working electrode is located within the solid-state reference electrode, the wire-shaped working electrode being separated from the solid-state reference electrode by means of the insulating material; the solid-state reference electrode is located within the ring-shaped auxiliary electrode.

6 Claims, 2 Drawing Sheets

(51) Int. Cl.
*G01N 27/30* (2006.01)
*G01N 27/48* (2006.01)

(56) References Cited

U.S. PATENT DOCUMENTS

| | | |
|---|---|---|
| 5,188,715 A | 2/1993 | Chen et al. |
| 5,431,800 A * | 7/1995 | Kirchhoff ............. C23C 16/455 204/290.01 |
| 7,578,912 B2 | 8/2009 | Buehler |
| 8,114,269 B2 * | 2/2012 | Cooper ................ A61B 5/6848 205/792 |
| 2008/0073225 A1 * | 3/2008 | Paulus ................ G01N 33/5438 205/792 |
| 2009/0178935 A1 * | 7/2009 | Reymond .......... G01N 27/3273 205/777.5 |

FOREIGN PATENT DOCUMENTS

| | | |
|---|---|---|
| CN | 103418924 A | 12/2013 |
| CN | 104458560 A | 3/2015 |
| CN | 107144613 A | 9/2017 |

OTHER PUBLICATIONS

Vishay Siliconix, "Power MOSFETs—Device Application Note AN609A: Power MOSFET Basics: Understanding Gate Charge and Suing it to Assess Switching Performance", Revision: Feb. 16, 2016 (Year: 2016).*
ISR of PCT/CN2017/101319.

* cited by examiner

THREE-ELECTRODE ARRAY LOCAL ELECTROCHEMICAL INFORMATION TESTING SYSTEM AND TESTING METHOD

TECHNICAL FIELD

The present invention relates to the field of electrochemical test, and in particular to a three-electrode array local electrochemical information testing system and a testing method.

BACKGROUND

In the electrochemical testing system, it is not only necessary to study the information of the entire electrode surface, but also to extend the characterization of the local electrochemical information on the electrode surface. For example, the local corrosion of metal is related to the electrochemical process at the interface. The distribution characteristics of local electrochemical parameters such as corrosion potential, current density and impedance are crucial for studying the distribution characteristics and the mechanism of local corrosion. The classical corrosion electrochemical methods such as cyclic voltammetry, polarization curves, electrochemical impedance spectroscopy, etc. can only obtain electrochemical information on the surface of the entire sample, giving statistical average data, which is difficult to distinguish electrochemical signals on local regions.

The development of various scanning microprobe electrochemical testing techniques provides a powerful technical support for the acquisition of local electrochemical information. In the aqueous environment medium, the scanning vibration electrode (SVET) can test the surface current density distribution of the metal material in the solution; the scanning electrochemical microscopy (SECM) can be used to evaluate the local electrochemical redox reaction activity; the local electrochemical impedance spectroscopy (LEIS) not only can study the full-frequency electrochemical impedance spectroscopy of a specific point, but also perform the scanning test at a fixed frequency to study the impedance distribution characteristics of the scanning surface. In the thin liquid film electrolyte system, the scanning Kelvin probe method (SKP) can be used to carry out the non-contact test electrode potential distribution. The applicable conditions and information obtained by the above testing methods have certain limitations, and only information on potential, current, impedance, etc., of the electrochemical testing system can be obtained, and some of them are indirect information. For example, SVET and LEIS lead to the test of the electric field gradient of the electrolyte based on the interface cathode and anode electrochemical reaction. The current density distribution and the local impedance obtained are not the reaction information of the substrate. SKP tests based on the surface work function and directly measures the Kelvin potential which is different from the potential at the electrode/solution interface.

However, in a more complicated non-uniform testing system of gas, liquid, and solid phases, it is impossible to use a scanning microprobe electrochemical technique such as SVET, LEIS, due to the inclusion of solid components. The conventional electrode array technology (EA) can only measure corrosion potential and galvanic current distribution, and cannot obtain local current, impedance and other data. The test information is not comprehensive and rich. Moreover, in a system in which the resistivity is relatively large and the electrolyte is dispersed, the potential accuracy measured by the array electrode is also affected by the ohmic potential drop of the corrosive environment and the dispersibility of the electrolyte. Therefore, it is necessary to develop a comprehensive electrochemical distribution information testing technology for heterogeneous systems.

SUMMARY

The object of the present invention is to provide a three-electrode array local electrochemical information testing system, which is more convenient to comprehensively acquire interface electrochemical information, such as galvanic current, corrosion potential, corrosion current density, electrochemical impedance spectroscopy and so on, in an electrode coupling/uncoupling state. At the same time, the present invention also provides a testing method for the system.

In order to solve the above technical problem, the present invention adopts the following technical solution:

A three-electrode array local electrochemical information testing system, comprising: a concentric ring three-electrode array, a high-speed switch and an electrochemical workstation, which are electrically connected in sequence; wherein the concentric ring three-electrode array comprises a plurality of concentric ring three-electrode units, adjacent concentric ring three-electrode units are separated by an insulating material; the concentric ring three-electrode unit comprises a ring-shaped auxiliary electrode, a solid-state reference electrode and a wire-shaped working electrode; the ring-shaped auxiliary electrode and the solid-state reference electrode are both formed in an ring-shaped shape; the wire-shaped working electrode is located within the solid-state reference electrode, the wire-shaped working electrode is separated from the solid-state reference electrode by means of the insulating material; the solid-state reference electrode is located within the ring-shaped auxiliary electrode, the solid-state reference electrode is separated from the ring-shaped auxiliary electrode by means of the insulating material; and the ring-shaped auxiliary electrode, the solid-state reference electrode and the wire-shaped working electrode are connected with the high-speed toggle switch.

In the above three-electrode array local electrochemical information testing system, the ring-shaped auxiliary electrode is made of a platinum plate, a platinum-plated black platinum plate, graphite or Hastelloy; and the solid-state reference electrode is a solid-state Ag reference electrode, an Ag/AgCl reference electrode or a zinc reference electrode. These three electrodes are solid-state reference electrodes, which are relatively stable and economical in conventional natural environmental corrosion systems.

The method for testing the above three-electrode array local electrochemical information testing system comprises:

first, controlling the high-speed switch so that the wire-shaped working electrode of the plurality of concentric ring three-electrode units is in an uncoupling state, and the ring-shaped auxiliary electrode, the solid-state reference electrode and the wire-shaped working electrode are connected with the electrochemical workstation;

then performing an open circuit potential test, wherein the method of performing the open circuit potential test comprises: testing a potential difference between the wire-shaped working electrode and the solid-state reference electrode;

obtaining the electrochemical behavior of a single wire-shaped working electrode by the open circuit potential test, and obtaining single-electrode electrochemical thermodynamic and kinetic information by data analysis of the electrochemical behavior of the single wire-shaped working electrode; the data analysis method includes: test data obtained by testing methods such as an open circuit potential, a polarization curve, electrochemical impedance spectroscopy, cyclic voltammetry, galvanic current, and a charging curve, and data analysis is performed according to the principle of corrosion electrochemistry to obtain thermodynamic and kinetic parameters such as corrosion potential distribution, current density distribution, electrochemical impedance, capacitance, and corrosion rate.

In the method for testing the above three-electrode array local electrochemical information testing system, the testing method further includes:

first, controlling the high-speed switch so that the wire-shaped working electrode of the plurality of concentric ring three-electrode units is in an uncoupling state, and the ring-shaped auxiliary electrode, the solid-state reference electrode and the wire-shaped working electrode are connected with the electrochemical workstation;

then performing a cyclic voltammetry curve test;

obtaining the electrochemical behavior of a single wire-shaped working electrode by the open circuit potential test, and obtaining single-electrode electrochemical thermodynamic and kinetic information by data analysis of the electrochemical behavior of the single wire-shaped working electrode; the data analysis method includes: the specific data analysis method performs analysis based on the cyclic voltammetry curve, and obtains relevant information such as electrode reaction, reaction reversibility, reaction potential window, current peak and so on.

In the method for testing the above three-electrode array local electrochemical information testing system, the testing method further includes:

first, controlling the high-speed toggle switch so that the wire-shaped working electrode of the plurality of concentric ring three-electrode units is in an uncoupling state, and the ring-shaped auxiliary electrode, the solid-state reference electrode and the wire-shaped working electrode are connected with the electrochemical workstation;

then performing a polarization curve test;

obtaining the electrochemical behavior of a single wire-shaped working electrode by the open circuit potential test, and obtaining single-electrode electrochemical, thermodynamic and kinetic information by data analysis of the electrochemical behavior of the single wire-shaped working electrode; the data analysis method includes: the data analysis method for a polarization curve includes linear fitting, global curve fitting, and Tafel linear extrapolation.

In the method for testing the above three-electrode array local electrochemical information testing system, the testing method further includes:

first, controlling the high-speed switch so that the wire-shaped working electrode of the plurality of concentric ring three-electrode units is in an uncoupling state, and the ring-shaped auxiliary electrode, the solid-state reference electrode and the wire-shaped working electrode are connected with the electrochemical workstation;

then performing an electrochemical impedance spectroscopy test;

obtaining the electrochemical behavior of a single wire-shaped working electrode by the open circuit potential test, and obtaining single-electrode electrochemical, thermodynamic and kinetic information by data analysis of the electrochemical behavior of the single wire-shaped working electrode; the data analysis method includes: the data analysis method for an electrochemical impedance spectroscopy includes the method of kinetic model analysis and the method of equivalent circuit simulation.

In the method for testing the above three-electrode array local electrochemical information testing system, the testing method further includes:

testing galvanic current distribution information between each wire-shaped working electrode and the ring-shaped auxiliary electrode and the solid-state reference electrode:

first, controlling the high-speed switch so that the wire-shaped working electrode of the plurality of concentric ring three-electrode units is in an uncoupling state, and the ring-shaped auxiliary electrode, the solid-state reference electrode and the wire-shaped working electrode are connected with the electrochemical workstation;

short-circuiting and connecting all the electrodes except the electrodes to be tested integrally by means of the high-speed switch, and testing the galvanic current between the electrode to be tested and the other electrodes one by one by means of the electrochemical workstation.

In the method for testing the above three-electrode array local electrochemical information testing system, the testing method further includes:

testing anode reaction current density of a single electrode: based on the galvanic current of a single electrode measured in a coupling state and the self-corrosion current density measured in an uncoupling state, and then performing algebraic addition. The coupling state refers to short-circuiting and connecting the respective working electrode wires in the three-electrode array to form a coupling state between the respective electrode reactions. The uncoupling state refers to the independent working state of each set of three electrodes constituting the array, and short-circuiting and connecting the working electrodes in each set of arrays.

Compared with the prior art, the present invention has the following advantages:

(1) A combination of the array electrode and the three-electrode system is realized, so as to comprehensively acquire interface electrochemical information, such as galvanic current, corrosion potential, corrosion current density, electrochemical impedance spectroscopy and so on, in an electrode coupling/uncoupling state. The test information is more comprehensive and rich. However, the conventional array electrode can only obtain the potential and galvanic current distribution information, and cannot obtain local current, impedance and other data.

(2) The short-distance concentric ring three-electrode array provided by the present invention realizes that the auxiliary electrode and the reference electrode 2 are circumferentially distributed around the working electrode at a close distance, and the power line distribution is more uniform during the test; and in the system in which the resistivity is relatively larger and the electrolyte disperses, the potential test accuracy is higher due to the closer distance between the reference electrode and the working electrode, and the current test is less prone to have a broken circuit.

The local electrochemical testing method has certain universality and can be extended to various heterogeneous corrosion electrochemical research systems such as atmospheric corrosion, soil corrosion, corrosion under deposits, corrosion under coating, or the like, or applied to the research of typical local corrosion types such as galvanic corrosion, crevice corrosion, and erosion corrosion.

Figure 1:
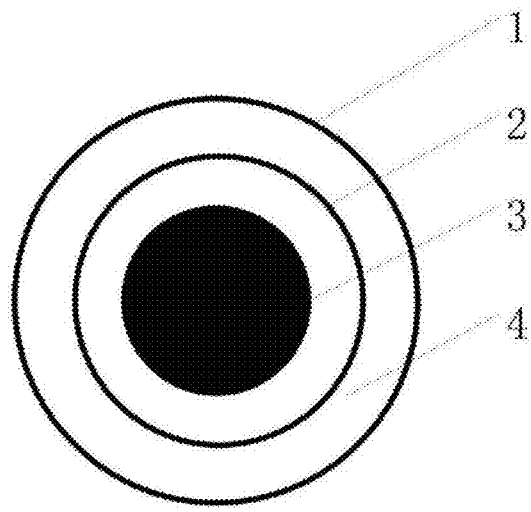
FIG. 1 is a schematic diagram illustrating the structure of a concentric ring three-electrode unit.

Description of reference numerals: 1—ring-shaped auxiliary electrode, 2—solid-state reference electrode, 3—wire-shaped working electrode, 4—insulating material, 5—concentric ring three-electrode array, 6—wire, 7—high-speed switch, 8—electrochemical workstation.

The present invention will be further described below in conjunction with the drawings and specific embodiments.

DESCRIPTION OF THE EMBODIMENTS

Figure 2:
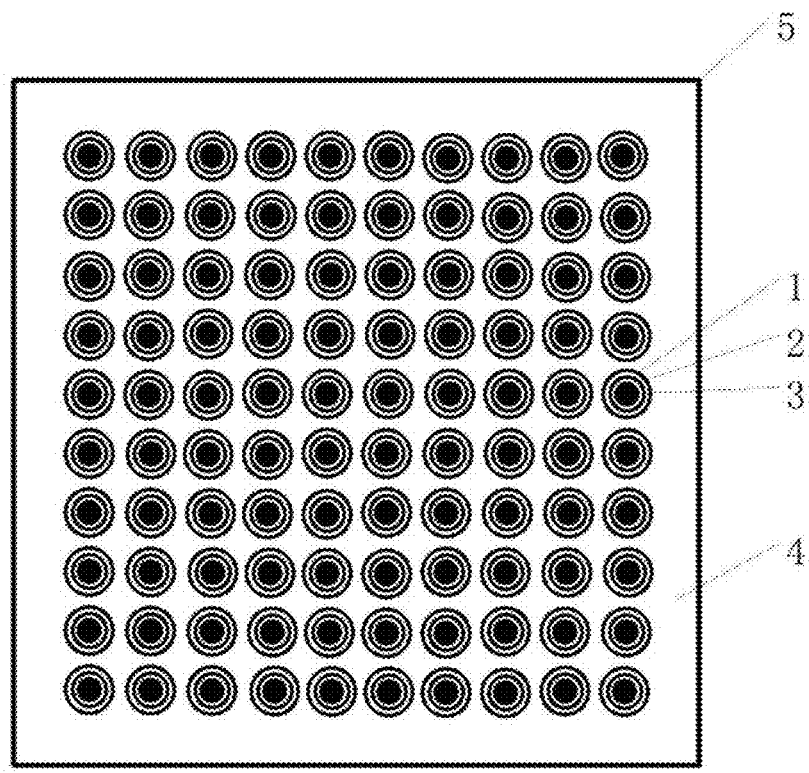
FIG. 2 is a schematic diagram illustrating the structure of a concentric ring three-electrode array.
Figure 3:
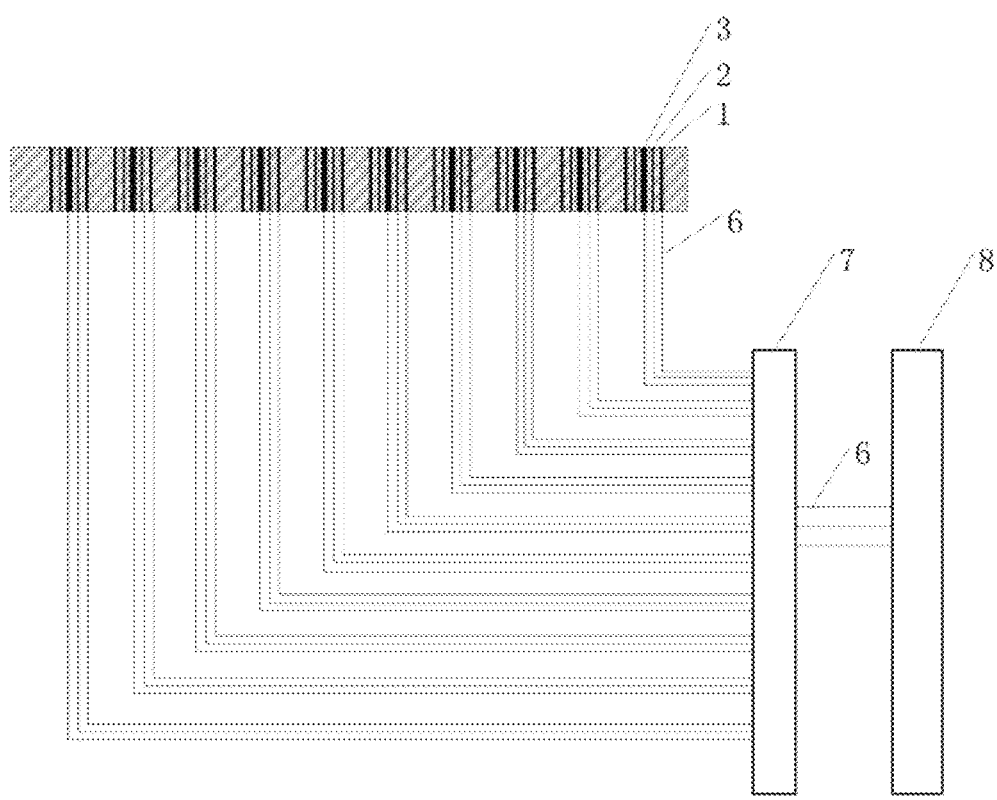
FIG. 3 is a schematic diagram illustrating a local electrochemical information testing system based on a concentric ring three-electrode array.

Embodiment 1 of the present invention: as shown in FIG. 1, FIG. 2 and FIG. 3, a three-electrode array local electrochemical information testing system comprises: a concentric ring three-electrode array 5, a high-speed switch 7 and an electrochemical workstation 8, which are electrically connected by wires 6 in sequence; wherein the concentric ring three-electrode array 5 comprises a plurality of concentric ring three-electrode units, adjacent concentric ring three-electrode units are separated by an insulating material 4; the concentric ring three-electrode unit comprises a ring-shaped auxiliary electrode 1, a solid-state reference electrode 2 and a wire-shaped working electrode 3; the ring-shaped auxiliary electrode 1 and the solid-state reference electrode 2 are both formed in an ring-shaped shape; the wire-shaped working electrode 3 is located within the solid-state reference electrode 2, the wire-shaped working electrode 3 is separated from the solid-state reference electrode 2 by means of the insulating material 4; the solid-state reference electrode 2 is located within the ring-shaped auxiliary electrode 1, the solid-state reference electrode 2 is separated from the ring-shaped auxiliary electrode 1 by means of the insulating material 4; and the ring-shaped auxiliary electrode 1, the solid-state reference electrode 2 and the wire-shaped working electrode 3 are connected with the high-speed toggle switch 7. The insulating material 4 is made of an insulating epoxy resin. The ring-shaped auxiliary electrode is made of a platinum plate, a platinum-plated black platinum plate, graphite or Hastelloy. The solid-state reference electrode 2 is a solid-state Ag reference electrode, an AgCl reference electrode or a zinc reference electrode.

The method for testing the three-electrode array local electrochemical information testing system described in the above embodiment comprises:

first, controlling the high-speed switch 7 so that the wire-shaped working electrode 3 of the plurality of concentric ring three-electrode units is in an uncoupling state, and the ring-shaped auxiliary electrode 1, the solid-state reference electrode 2 and the wire-shaped working electrode 3 are connected with the electrochemical workstation 8; then performing an open circuit potential test, wherein the method of performing the open circuit potential test comprises: testing a potential difference between the wire-shaped working electrode and the solid-state reference electrode; obtaining the electrochemical behavior of a single wire-shaped working electrode 3 by the open circuit potential test, and obtaining single-electrode electrochemical, thermodynamic and kinetic information by data analysis of the electrochemical behavior of the single wire-shaped working electrode 3; the data analysis method includes: test data obtained by testing methods such as an open circuit potential, a polarization curve, electrochemical impedance spectroscopy, cyclic voltammetry, galvanic current, and a charging curve, and data analysis is performed according to the principle of corrosion electrochemistry to obtain thermodynamic and kinetic parameters such as corrosion potential distribution, current density distribution, electrochemical impedance, capacitance, and corrosion rate.

The testing method further includes: first, controlling the high-speed switch 7 so that the wire-shaped working electrode 3 of the plurality of concentric ring three-electrode units is in an uncoupling state, and the ring-shaped auxiliary electrode 1, the solid-state reference electrode 2 and the wire-shaped working electrode 3 are connected with the electrochemical workstation 8; then performing a cyclic voltammetry curve test; obtaining the electrochemical behavior of a single wire-shaped working electrode 3 by the open circuit potential test, and obtaining single-electrode electrochemical, thermodynamic and kinetic information by data analysis of the electrochemical behavior of the single wire-shaped working electrode 3; the data analysis method includes: performing analysis based on the cyclic voltammetry curve, and obtaining relevant information such as electrode reaction, reaction reversibility, reaction potential window, current peak and so on.

The testing method further includes: first, controlling the high-speed toggle switch 7 so that the wire-shaped working electrode 3 of the plurality of concentric ring three-electrode units is in an uncoupling state, and the ring-shaped auxiliary electrode 1, the solid-state reference electrode 2 and the wire-shaped working electrode 3 are connected with the electrochemical workstation 8; then performing a polarization curve test; obtaining the electrochemical behavior of a single wire-shaped working electrode 3 by the open circuit potential test, and obtaining single-electrode electrochemical, thermodynamic and kinetic information by data analysis of the electrochemical behavior of the single wire-shaped working electrode 3; the data analysis method includes: the data analysis method for a polarization curve includes linear fitting, global curve fitting, and Tafel linear extrapolation.

The testing method further includes: first, controlling the high-speed switch 7 so that the wire-shaped working electrode 3 of the plurality of concentric ring three-electrode units is in an uncoupling state, and the ring-shaped auxiliary electrode 1, the solid-state reference electrode 2 and the wire-shaped working electrode 3 are connected with the electrochemical workstation 8; then performing an electrochemical impedance spectroscopy test; obtaining the electrochemical behavior of a single wire-shaped working electrode 3 by the open circuit potential test, and obtaining single-electrode electrochemical, thermodynamic and kinetic information by data analysis of the electrochemical behavior of the single wire-shaped working electrode 3; the data analysis method includes: the data analysis method for an electrochemical impedance spectroscopy includes the method of kinetic model analysis and the method of equivalent circuit simulation.

The testing method further includes: testing galvanic current distribution information between each wire-shaped working electrode 3 and the ring-shaped auxiliary electrode 1 and the solid-state reference electrode 2: first, controlling the high-speed switch 7 so that the wire-shaped working electrode 3 of the plurality of concentric ring three-electrode units is in an uncoupling state, and the ring-shaped auxiliary electrode 1, the solid-state reference electrode 2 and the wire-shaped working electrode 3 are connected with the electrochemical workstation 8; short-circuiting and connecting all the electrodes except the electrodes to be tested integrally by means of the high-speed switch 7, and testing the current between the electrode to be tested and the other electrodes one by one by means of the electrochemical workstation (8).

The testing method further includes: testing anodic reaction current density of a single electrode: based on the galvanic current of a single electrode measured in a coupling state and the self-corrosion current density measured in an uncoupling state, and then performing algebraic addition.

What is claimed is:

1. A method for testing a three-electrode array local electrochemical information testing system, the method comprising: providing a three-electrode array local electrochemical information testing system comprising: a concentric ring three-electrode array (5), a high-speed switch (7) and an electro chemical workstation (8), which are electrically connected in sequence; wherein the concentric ring three-electrode array (5) comprises a plurality of concentric ring three-electrode units, adjacent concentric ring three-electrode units are separated by an insulating material (4); each concentric ring three-electrode unit comprises a ring-shaped auxiliary electrode (1), a solid-state reference electrode (2) and a wire-shaped working electrode (3); the ring-shaped auxiliary electrode (1) and the solid-state reference electrode (2) are both formed in an ring-shaped shape; the wire-shaped working electrode (3) is located within the solid-state reference electrode (2), the wire-shaped working electrode (3) is separated from the solid-state reference electrode (2) by means of the insulating material (4), the solid-state reference electrode (2) is located within the ring-shaped auxiliary electrode (1), the solid-state reference electrode (2) is separated from the ring-shaped auxiliary electrode (1) by means of the insulating material (4); and the ring-shaped auxiliary electrode (1), the solid-state reference electrode (2) and the wire-shaped working electrode (3) are connected with the high-speed switch (7); the method further comprising:

first, controlling the high-speed switch (7) so that the wire-shaped working electrode (3) of the plurality of concentric ring three-electrode units is in an uncoupling state, and the ring-shaped auxiliary electrode (1), the solid-state reference electrode (2) and the wire-shaped working electrode (3) are connected with the electrochemical workstation (8), then performing an open circuit potential test, wherein the method of performing the open circuit potential test comprises: testing a potential difference between the wire-shaped working electrode and the solid-state reference electrode; and obtaining the electrochemical behavior of a single wire-shaped working electrode (3) by the open circuit potential test, and obtaining single-electrode electrochemical, thermodynamic and kinetic information by data analysis of the electrochemical behavior of the single wire-shaped working electrode (3).

2. The method for testing the three-electrode array local electrochemical information testing system according to claim 1, wherein the method further comprises:

first, controlling the high-speed switch (7) so that the wire-shaped working electrode (3) of the plurality of concentric ring three-electrode units is in an uncoupling state, and the ring-shaped auxiliary electrode (1), the solid-state reference electrode (2) and the wire-shaped working electrode (3) are connected with the electrochemical workstation (8); then performing a cyclic voltammetry curve test;

obtaining the electrochemical behavior of a single wire-shaped working electrode (3) by the open circuit potential test, and obtaining single-electrode electrochemical, thermodynamic and kinetic information by data analysis of the electrochemical behavior of the single wire-shaped working electrode (3).

3. The method for testing the three-electrode array local electrochemical information testing system according to claim 1, wherein the method further comprises:

first, controlling the high-speed switch (7) so that the wire-shaped working electrode (3) of the plurality of concentric ring three-electrode units is in an uncoupling state, and the ring-shaped auxiliary electrode (1), the solid-state reference electrode (2) and the wire-shaped working electrode (3) are connected with the electrochemical workstation (8); then performing a polarization curve test;

obtaining the electrochemical behavior of a single wire-shaped working electrode (3) by the open circuit potential test, and obtaining single-electrode electrochemical, thermodynamic and kinetic information by data analysis of the electrochemical behavior of the single wire-shaped working electrode (3).

4. The method for testing the three-electrode array local electrochemical information testing system according to claim 1, wherein the method further comprises:

first, controlling the high-speed switch (7) so that the wire-shaped working electrode (3) of the plurality of concentric ring three-electrode units is in an uncoupling state, and the ring-shaped auxiliary electrode (1), the solid-state reference electrode (2) and the wire-shaped working electrode (3) are connected with the electrochemical workstation (8); then performing an electrochemical impedance spectroscopy test;

obtaining the electrochemical behavior of a single wire-shaped working electrode (3) by the open circuit potential test, and obtaining single-electrode electrochemical, thermodynamic and kinetic information by data analysis of the electrochemical behavior of the single wire-shaped working electrode (3).

5. The method for testing the three-electrode array local electrochemical information testing system according to claim 1, wherein the method further comprises: measuring galvanic current distribution information between the wire-shaped working electrode (3) and the ring-shaped auxiliary electrode (1), and galvanic current distribution information between the wire-shaped working electrode (3) and the solid-state reference electrode (2), for each concentric ring three electrode unit:

first, controlling the high-speed switch (7) so that the wire-shaped working electrode (3) of each concentric ring three-electrode unit is in an uncoupling state, and the ring-shaped auxiliary electrode (1), the solid-state reference electrode (2) and the wire-shaped working electrode (3) of each concentric ring three-electrode unit are connected with the electrochemical workstation (8);

short-circuiting and connecting together in a single circuit all the wire-shaped working electrodes except the wire-shaped working electrode to be tested by means of the high-speed switch (7), and testing the current between the wire-shaped working electrode to be tested and each of other wire-shaped working electrodes of the plurality of concentric ring three-electrode units by means of the electrochemical workstation (8).

6. The method for testing the three-electrode array local electrochemical information testing system according to claim 1, wherein the method further comprises:

testing anode reaction current density of each wire-shaped working electrode: measuring galvanic current of each wire-shaped working electrode in a coupling state, measuring self-corrosion current density of each wire-shaped working electrode in an uncoupling state, and adding together the galvanic current of each wire-shaped working electrode in a coupling state and the self-corrosion current density of each wire-shaped working electrode in an uncoupling state.

* * * * *